(12) United States Patent
Derr et al.

(10) Patent No.: US 7,025,516 B2
(45) Date of Patent: Apr. 11, 2006

(54) MULTILAYER PRINTING MATERIAL AND THE USE THEREOF

(75) Inventors: Andreas Derr, Wutöschingen (DE); Patrick Zahn, Eisenbach (DE)

(73) Assignee: Testo AG, Lenzkirch (DE)

( * ) Notice: Subject to any disclaimer, the term of this patent is extended or adjusted under 35 U.S.C. 154(b) by 0 days.

(21) Appl. No.: 10/466,445

(22) PCT Filed: Jan. 5, 2002

(86) PCT No.: PCT/EP02/00050

§ 371 (c)(1),
(2), (4) Date: Dec. 12, 2003

(87) PCT Pub. No.: WO02/057072

PCT Pub. Date: Jul. 25, 2002

(65) Prior Publication Data

US 2004/0112521 A1     Jun. 17, 2004

(30) Foreign Application Priority Data

Jan. 17, 2001   (DE) ................................ 101 01 935

(51) Int. Cl.
*B41J 2/315*  (2006.01)
(52) U.S. Cl. ................... 400/120.03; 400/120.01; 347/171; 347/215
(58) Field of Classification Search .......... 400/120.01, 400/120.03, 120.02; 347/215, 216, 171
See application file for complete search history.

(56) References Cited

U.S. PATENT DOCUMENTS

| | | | | |
|---|---|---|---|---|
| 4,098,935 A | * | 7/1978 | Knudsen | 428/40.9 |
| 5,143,466 A | * | 9/1992 | Moncrieff Baldwin et al. | 402/79 |
| 5,362,554 A | * | 11/1994 | Holzer et al. | 442/73 |
| 5,417,458 A | * | 5/1995 | Best et al. | 283/51 |
| 5,730,469 A | * | 3/1998 | Heimerdinger et al. | 283/81 |
| 5,752,776 A | * | 5/1998 | Kunreuther | 400/82 |
| 6,005,595 A | * | 12/1999 | Vanwey | 347/171 |
| 6,254,711 B1 | * | 7/2001 | Bull et al. | 156/234 |
| 6,317,149 B1 | * | 11/2001 | Mochida et al. | 347/173 |
| 6,482,490 B1 | * | 11/2002 | Hanahara et al. | 428/40.1 |

FOREIGN PATENT DOCUMENTS

EP           1 002 753 B1     4/2001

* cited by examiner

*Primary Examiner*—Daniel J. Colilla
*Assistant Examiner*—Dave A. Ghatt
(74) *Attorney, Agent, or Firm*—Muirhead and Saturnelli, LLC

(57) ABSTRACT

The invention relates to a multilayer printing material (20) for a printing group (10) of a printer, comprising a support layer (21) and at least one printable layer (22), self-adhesive on one face, that rests with its self-adhesive face (23) on a contact area of the support layer (21) in an adhesive manner. Said layer can be detached from the contact area and has at least one printable face (25). At least one break point (24) is provided on the support layer (21) and is adapted to substantially compensate for any differences in length caused by the difference in length of the support layer (21) relative to the printable layer (22) when the printing material (20) passes through the printing group (10). The invention further relates to the use of the inventive printing material.

4 Claims, 3 Drawing Sheets

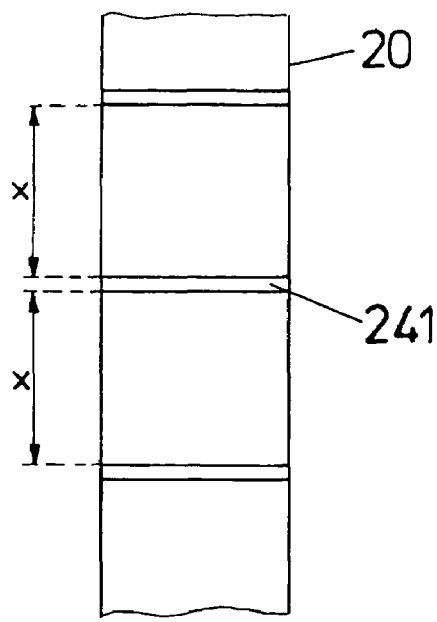
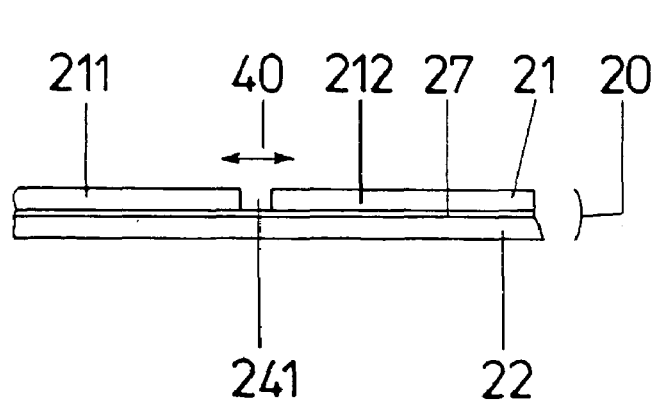
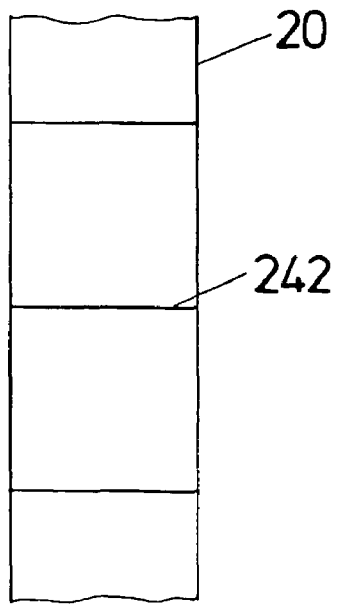
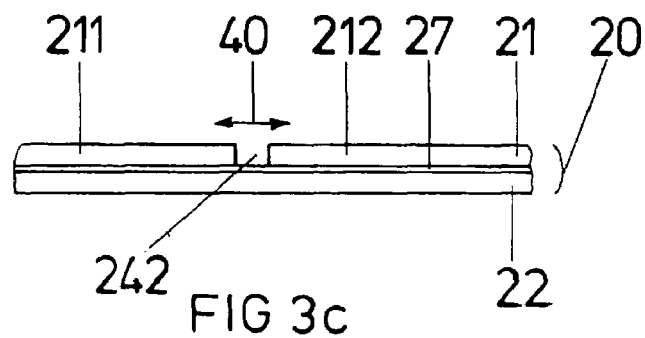
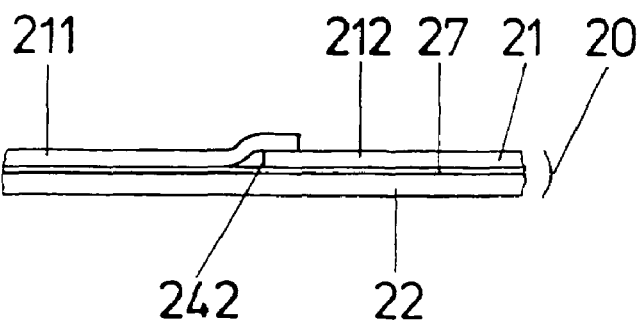

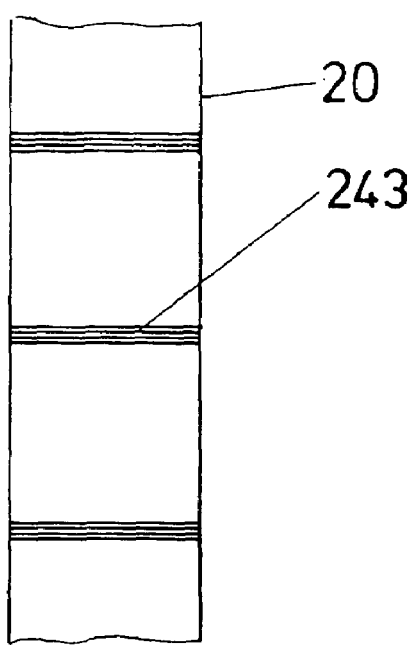
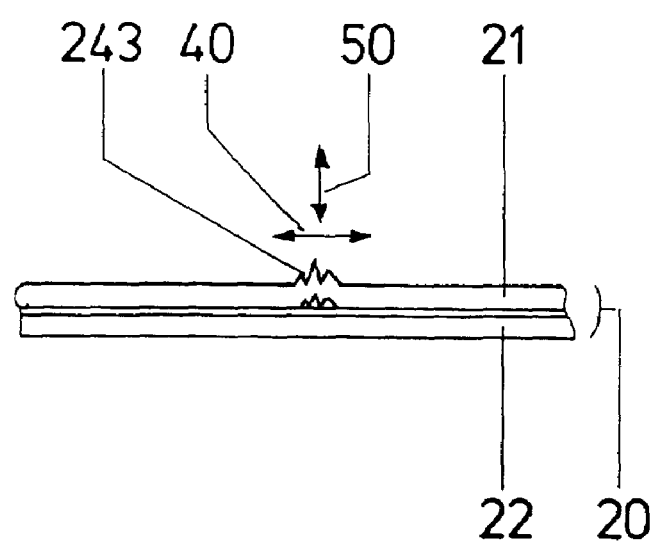
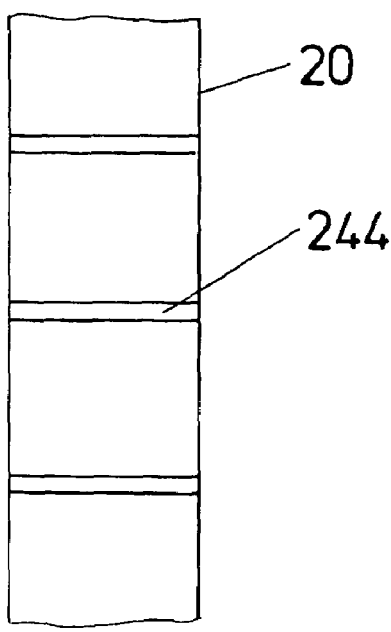
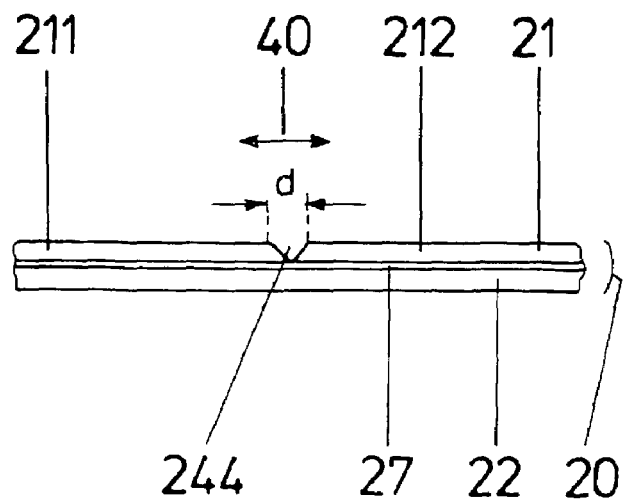

MULTILAYER PRINTING MATERIAL AND THE USE THEREOF

BACKGROUND OF THE INVENTION

1. Technical Field

The present invention relates to a multilayered printing material. Accordingly, a printing material is provided with a carrier layer and with at least one one-sided self-adhesive, printable layer which rests with its self-adhesive surface on a supporting surface of the carrier layer in an adhering manner, and which is again detachable from the supporting surface and has at least one printable surface. In addition, the present invention relates to the use of the printing material.

2. Description of Related Art

Goods to be shipped frequently require immediate labeling. In the food industry, for example, shipping of foods such as frozen products must be monitored and controlled using electronic devices. Data required for shipping and data identifying the product is typically retained on such a label. Measuring data memory devices are specially provided for this purpose, from whose memory the respective data is read out on site and is printed onto the particular labels. For proof of proper transportation and the condition of the product, the label is subsequently applied directly to the product or to a container accommodating the products.

For this purpose, there are basically two different labeling mechanisms:

The continuous paper used for labeling is not self-adhesive and for this reason may only be applied to the merchandise by using an adhesive film, glue, or the like. However, due to the additionally required attaching means, such a method is extremely expensive and is also difficult to be automated, resulting in significant extra costs.

In addition, self-adhesive continuous paper, composed of a carrier film and a printing paper adhering thereto, may also be used. The printing paper has an adhesive film and may thus be applied directly to the merchandise to be shipped without any extra application. Here, the process is made easier for the user, which in turn makes this form of labeling more advantageous compared to the first method, in particular with regard to costs.

Thermal printers which are suitable for printing paper, cardboard, foil, etc., are used for printing on such a self-adhesive continuous paper. The printing unit of the thermal printer has, as a rule, one or more thermal print heads which cooperate with a print roller in order to print the continuous paper passing through the printing unit.

However, printing of self-adhesive continuous paper using a thermal printer has several practical and technical disadvantages:

Self-adhesive continuous paper may not be inserted into printing units of common printers; it is in fact only suitable for particular special printer variants. A single type of paper is frequently only usable in such special printer variants; the same manufacturer of the special printer variants mostly distributes this paper. Understandably, this paper is much more expensive than common self-adhesive continuous paper. In addition, the handling of the printing units of the particular special printer variants is very laborious since the continuous paper has to be threaded into the printing unit in a time-consuming manner. Since there is only a relatively small number of printers available on the market which can communicate with a measuring data memory device, and which, for the purpose of printing out measuring data, are equipped with such a special printing unit for printing and transporting self-adhesive continuous paper, the user is practically forced to use such a printer and with it also the appropriate and more expensive paper.

However, the self-adhesive and printable continuous paper used in such printers has a serious disadvantage which is explained in the following based on FIG. 6:

Self-adhesive continuous paper 20, used in practice, is typically wound up on a roll and is composed of two layers 21, 22. First layer 21 is the carrier foil and second layer 22 is the self-adhesive thermal paper. Carrier paper 21, adhering with a surface 26 to backside 23 of self-adhesive thermal paper 22, protects adhesive layer 27 of thermal paper 22. Due to the fact that continuous paper 20 is wound up on a roll and thus the inner of the two layers, typically the carrier foil, always has a smaller diameter than the outer layer resting thereon, the inner layer in its wound-up state is shorter than the outer layer.

If this continuous paper 20 is inserted into a conventional printing unit 10 of a thermal printer, then, as a consequence of deflecting continuous paper 20 in connection with the particular pressure acting against pressure rollers and conveyor rolls 12–14, squeezing of both layers 21, 22 takes place, resulting in the separation of thermal paper 22 from carrier foil 21. Due to the temporary separation of both layers 21, 22 from one another, a length adjustment of the originally wound-up paper takes place which devolves into the straight after passing through printing unit 10. Since the same length of both carrier paper 21 and thermal paper 22 passes through printing unit rolls 12–14, this length excess of the thermal paper accumulates upstream from printing unit rolls 13, 14 and increases as the printing process proceeds. If the length excess of thermal paper 22 becomes too great, then printing unit 10 may no longer properly convey continuous paper 20. This conveyance interruption frequently results in illegible misprints. Thus, the merchandise to be shipped may no longer be labeled in the proper form. This has serious consequences if such a misprint is applied to the merchandise to be labeled and is detected either very late or not at all. In this case, the merchandise mostly may not be shipped due to the absence of the required data. In addition, retroactive proof of the data required for this merchandise, e.g., the best-before date, is no longer possible.

Understandably, these errors caused by incorrect label printing should be avoided.

Therefore, it is desirable to provide a printable and self-adhesive continuous paper which avoids misprints to the greatest possible extent. Moreover, the continuous paper should not be limited to special printer variants.

SUMMARY OF THE INVENTION

According to the present invention, a multilayered printing material and a method of using the multilayered printing material in thermal printers are disclosed having features that address the above-noted problems.

A printing material according to the definition of the species is accordingly provided which is characterized in that at least one separation point is provided on the carrier layer, the separation point being designed in such a way that, when the printing material passes through the printing unit, it adjusts to the greatest possible extent a difference in length caused by differing longitudinal expansions of the carrier layer relative to the printable layer.

An adjustment in length to the greatest possible extent takes place between the carrier layer and the printable layer while the continuous paper passes through over a separation point. According to the present invention, by providing at least one separation point in the carrier layer it may be ensured that there is no pile up of paper excess upstream from the printing unit rolls or the print head. The continuous paper may thus pass through the printing unit in an unobstructed manner. It is possible in a very advantageous way to provide the consumer with multilayered continuous paper, usable in a plurality of printer variants designed for it, in a very cost-effective and thus attractive form.

The separation points, provided for the adjustment in length, advantageously have a uniform spacing on the carrier layer. The separation points are designed in such a way that the carrier layer is thus scored, cut, stamped out, or perforated in any other way. It is also conceivable in an advantageous embodiment that the printable layer also has at least one scored, cut, stamped out, or perforated separation point. It is possible in this way to also adjust [a difference in length] caused by the carrier layer. In addition, it is also conceivable that the self-adhesive, printable layer as well as the carrier layer have separation points.

The printable layer is typically designed to be adhesive on one side, so that it adherently rests with its self-adhesive surface on the carrier layer which protects the self-adhesive surface. In a very advantageous embodiment, the self-adhesive surface of the printable layer is merely partially coated with a self-adhesive compound. In contrast to a full coat with self-adhesive compound, this embodiment has the advantage that smaller amounts of adhesive compound are required which makes the manufacturing process and thus the continuous paper significantly more advantageous and which facilitates a subsequent detachment of the self-adhesive, printable layer from the merchandise. The self-adhesive compound applied to the printable layer is typically designed in such a way that it makes it possible to detach it from the carrier layer without residue. Furthermore, it is particularly advantageous if the printable layer, after having been affixed to the merchandise to be shipped, is detachable again if possible without residue.

The multilayered printing material is advantageously designed as continuous material, in particular as continuous paper. Such a continuous material, i.e., a continuous paper, is understood to be a long material which is wound up on a roll especially provided for it and thus having, with regard to length, no limited side format, the material naturally having a finite length, but theoretically it may also have infinite length. The multilayered continuous paper according to the present invention has typically a continuous carrier layer and at least one continuous print layer, these layers not necessarily having to run continuously. In particular, the separation points mentioned may continuously cut through the continuous carrier layer. It is essential here that this continuous carrier layer, which may be divided by the separation points into a plurality of individual carrier layers, constitutes a contiguous structure on the continuous paper. The same is true for the continuous print layer.

In a typical embodiment, the carrier layer is made of paper, cardboard, or also of a thermal foil. The printable layer is typically made of a thermal foil. However, the printable layer and the carrier layer are not limited to the above-mentioned materials, they may be expanded to any printable material.

In a very advantageous embodiment, the printing material is composed of a single carrier layer and two printable layers. The two printable layers each adhere with their self-adhesive backsides to the respective supporting surface of the carrier layer. A printing material printable and self-adhesive on both sides is provided in this way.

The printer is designed as a thermal printer in an advantageous embodiment of the present invention. The printing material is not limited to a specific printer type of a thermal printer, but it may also be used in any commercially available thermal printers. Furthermore, the present invention is not exclusively limited to continuous paper for use in thermal printers, but, within the scope of the invention, it may be expanded to all printers which are suitable for printing the continuous paper according to the present invention.

Further advantageous embodiments and refinements of the present invention arise from the subclaims, as well as from the description with reference to the drawing.

BRIEF DESCRIPTION OF THE DRAWING

The present invention is explained in greater detail in the following based on the exemplary embodiments shown in the figures of the drawing.

FIG. 2 shows a detail of the printing material according to the present invention in a first exemplary embodiment;

FIG. 3 shows a detail of the printing material according to the present invention in a second exemplary embodiment;

FIG. 4 shows a detail of a printing material according to the present invention in a third exemplary embodiment;

FIG. 5 shows a detail of a printing material according to the present invention in a fourth exemplary embodiment;

DETAILED DESCRIPTION OF VARIOUS EMBODIMENTS

Figure 1:
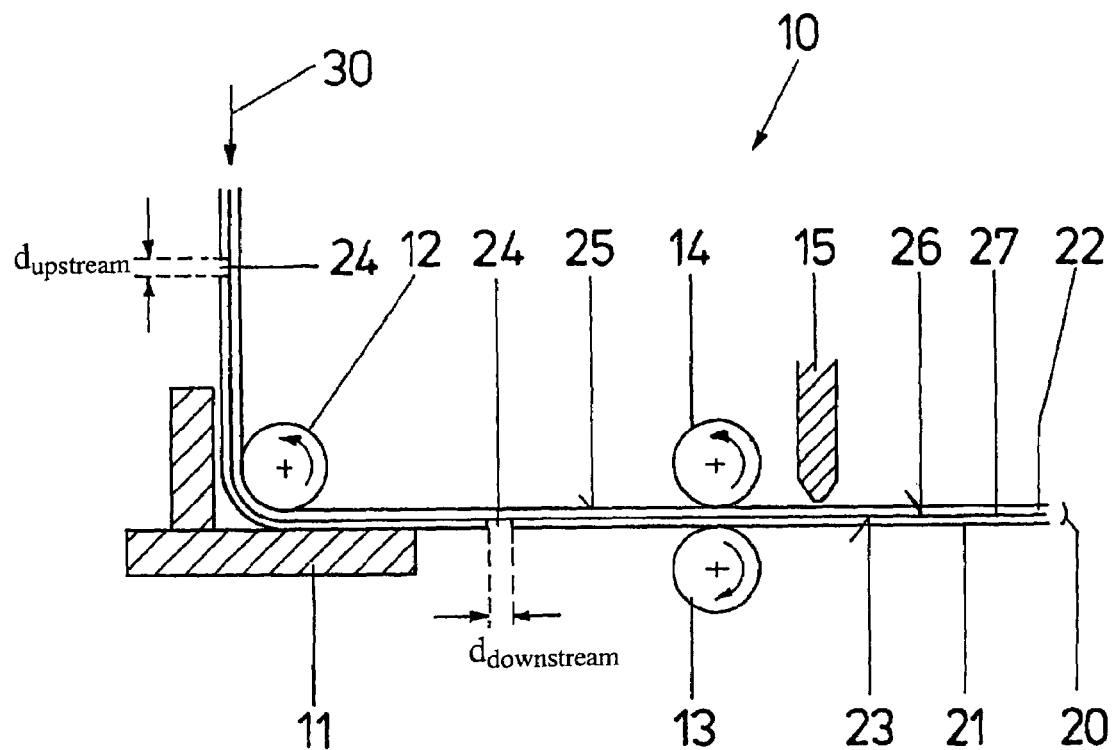
FIG. 1 in a schematic cross section shows a printing material according to the present invention passing through the printing unit of a printer.
Figure 6:
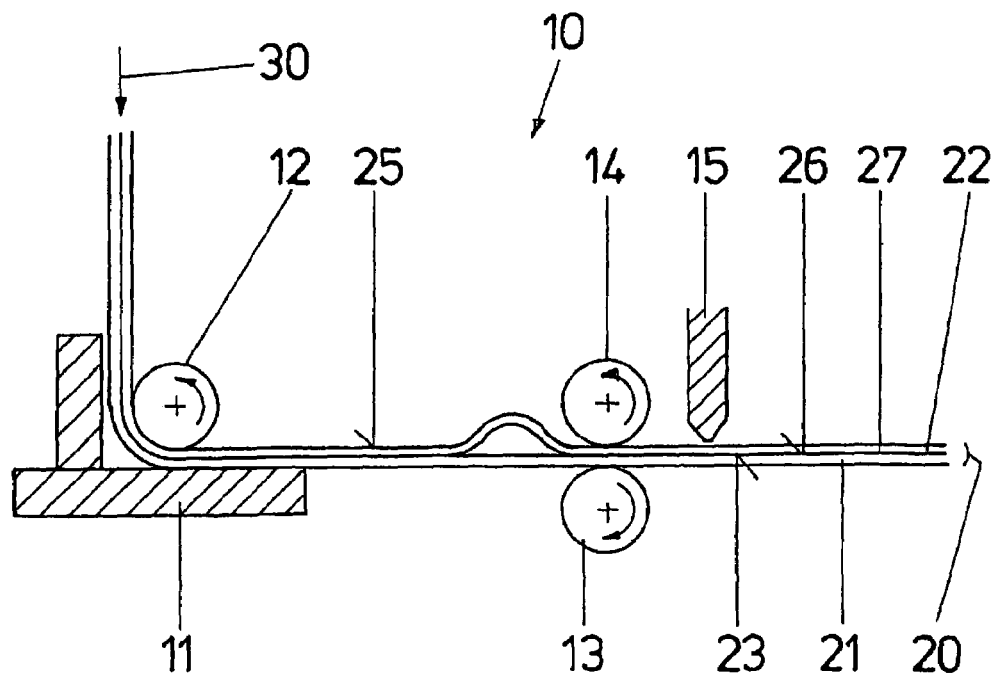
FIG. 6 in a schematic cross section shows a printing unit of a printer in which a continuous paper according to the related art is inserted.

The same elements or elements having the same functions were given the same reference numbers in all figures of the drawing, unless otherwise noted. Furthermore, in order to better illustrate the principle of the present invention, the respective dimensions have been to some extent greatly enlarged in all figures of the drawing, in particular in the illustration of the layer thicknesses of the continuous paper.

FIG. 1 shows a detail of a printing unit, the continuous paper according to the present invention being guided through it. In FIG. 1, the printing unit is 10 and the continuous paper is 20. Printing unit 10 has a guiding frame 11 and a deflecting roller 12. Furthermore, two pressure rollers 13, 14 and a print head 15 are provided. The rolls 12, 13, 14 ensure a forward feed of continuous paper 20.

Continuous paper 20 has a two-layered design and has a carrier foil 21, printing paper 22 with its self-adhesive surface 23 adhering to the supporting surface 26 of the carrier foil. A self-adhesive compound 27 is provided between carrier foil 21 and printing paper 22. In addition, printing paper 22 has a plurality of separation points 24. The exact design of separation points 24 is described in greater detail in the following with reference to FIGS. 2 through 5.

Continuous paper 20 is inserted into printing unit 10 in forward feed direction 30. Continuous paper 20 is deflected using guiding frame 11 and deflection roller 12, in the present case in a 90-degree angle. Continuous paper 20 is then inserted between pressure rollers 13, 14 and subsequently passes over a print head 15. Print head 15 is positioned in such a way that it prints a printable surface 25 of printing paper 22.

In FIG. 1, separation points 24 are depicted as stamped-out sections of carrier foil 21. Deflection roller 12 squeezes printing paper 22 and carrier foil 21. The excess in length of printing paper 22, resulting from this action, is adjusted via separation points 24. For example, a separation point 24, spatially situated upstream from deflection roller 12, has a gap $d_{upstream}$. This gap increases after squeezing, so that, after passing deflection rollers 12, a gap $d_{downstream}$ appears, where $d_{downstream} \geq d_{upstream}$.

FIG. 2 shows a first embodiment of continuous paper 20 according to the present invention. Separation points 24 are provided here in the form of stamped-out sections 241. Separation points 24 have a uniform spacing x relative to one another. When continuous paper 20 passes through printing unit 10, adjacent layers 211, 212 of carrier foil 21 may be pulled apart or pushed together in lateral direction 40. (FIG. 2b)

FIG. 3 shows a second embodiment of continuous paper 20 according to the present invention in which carrier foil 21 is cut in sections 242. When passing through printing unit 10, the adjacent layers 211, 212 of carrier foil 21 are pushed apart in lateral direction 40, or are displaced with respect to each other in such a way that each layer 211 overlaps the other layer 212 (FIG. 3c).

In a third embodiment according to FIG. 4, separation points 24 are designed as perforation 243 situated on carrier foil 21. When passing through printing unit 10, perforations 243 contract in lateral direction 40 or extend in direction 50 (FIG 4b). Thus, the adjustment in length takes place here by the deformation of perforations 243 in lateral direction and vertical direction 40, 50.

FIG. 5 shows a fourth embodiment of continuous paper 20 in which separation points 24 are designed as scored sections 244. Prior to passing through the printing unit, scored sections 244 have an essentially V shaped cross section or a U shaped cross section having a gap d at the surface. When continuous paper 20 passes through printing unit 10, adjacent areas 211, 212 of carrier foil 21 may be displaced against each other so that gap d of scored sections 244 is increased or decreased in lateral direction 40 (FIG. 5b).

To recapitulate, it may be asserted that, by totally abandoning the methods known to date, the self-adhesive and printable continuous paper described, having separation points, may be used in any printer suitable for it, without having to accept the associated disadvantages of continuous paper according to the related art.

The present invention has been presented based on the above description in order to explain the principle of the invention and its practical application as best as possible; however, with a suitable modification, the present invention may naturally be implemented in various other embodiments.

What is claimed is:

1. A method of using a printing material in a thermal printer, comprising:
   forward feeding the printing material through the thermal printer, wherein the printing material includes a carrier layer and a printable layer and wherein the printable layer is adhered to the carrier layer;
   adjusting a length of the printable layer using at least one separation point positioned in either the carrier layer or the printable layer; and
   printing on a printable surface of the printable layer, wherein the printable layer includes a thermal foil.

2. The method as recited in claim 1, wherein the carrier layer is selected from the group consisting of: paper, cardboard and thermal foil.

3. The method as recited in claim 1, wherein the at least one separation point is selected from the group consisting of: a scored section, a cut-out section, a stamped-out section, and a perforated section.

4. A method of using a printing material in a thermal printer, comprising:
   forward feeding the printing material through the thermal printer, wherein the printing material includes a carrier layer and a printable layer and wherein the printable layer is adhered to the carrier layer;
   adjusting a length of the printable layer using at least one separation point positioned in either the carrier layer or the printable layer;
   printing on a printable surface of the printable layer; and
   adjusting the length of the printable layer using at least one additional separation point positioned in either said carrier layer or said at least one printable layer.

* * * * *